No. 884,398. PATENTED APR. 14, 1908.
C. F. LUCAS.
POULTRY PERCH.
APPLICATION FILED OCT. 3, 1907.
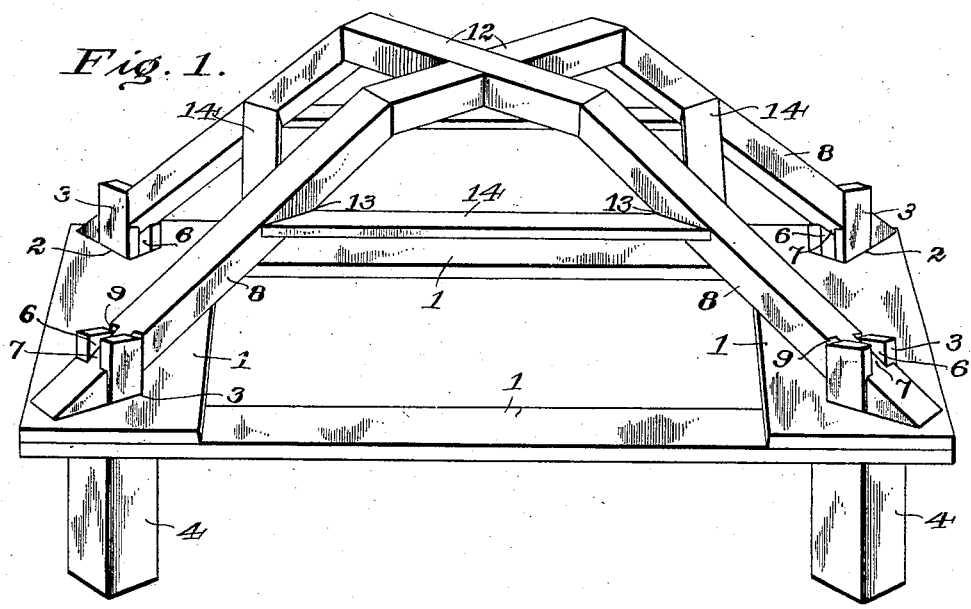
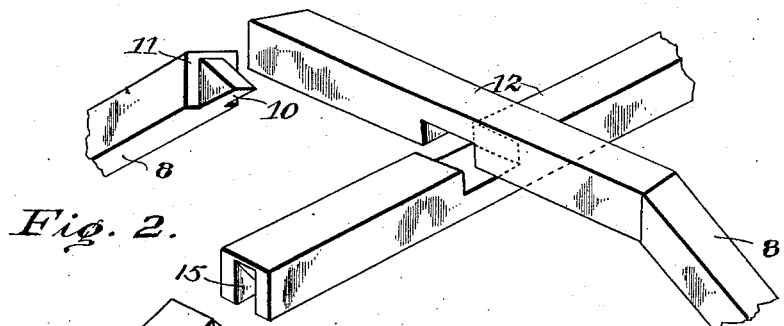
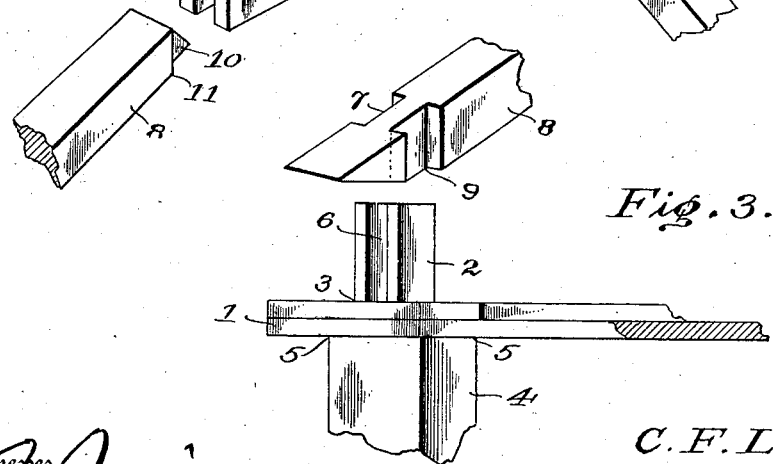
Inventor
C. F. Lucas.

UNITED STATES PATENT OFFICE.

CAROLINE F. LUCAS, OF MAYHILL, TERRITORY OF NEW MEXICO.

POULTRY-PERCH.

No. 884,398.   Specification of Letters Patent.   Patented April 14, 1908.

Application filed October 3, 1907. Serial No. 395,738.

*To all whom it may concern:*

Be it known that I, CAROLINE F. LUCAS, a citizen of the United States, residing at Mayhill, in the county of Otero, New Mexico, have invented certain new and useful Improvements in Poultry-Perches, of which the following is a specification.

This invention provides a framework for poultry to perch or roost upon, and which may be readily set up or reduced to knock down condition for storing or transporting, the several parts interlocking so as to obviate the use of keys or fastenings of any kind.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which;

Figure 1 is a perspective view of a perch embodying the invention. Fig. 2 is a detail perspective view of adjacent ends of an inclined and a horizontal bar, the parts being separated. Fig. 3 is a detail perspective view of a post, the lower end of an inclined bar and the adjacent ends of overlapped strips, the several parts being separate and arranged in the relative position which they will occupy in the structure when assembled.

Corresponding and like parts are referred to in the following description and indicated in all the views of the drawings by the same reference characters.

The frame comprising the perch consists of four strips 1 of any desired length and width according to the size of the perch. These strips are arranged to form a frame of rectangular outline and their end portions overlap. An opening 2 is provided near each end of the strips and when the latter are placed together, the openings 2 in the overlapped end portions register and receive the upper reduced ends 3 of posts 4, thereby holding the said strips in relative position. The openings 2 are angular and the reduced ends 3 of the posts 4 are of corresponding shape in horizontal section so as to prevent relative turning of the posts or strips.

The posts 4 have shoulders 5 at the base of the reduced ends 3 and these shoulders come beneath the overlapped ends of the strips 1 and support the same. Slots 6 extend inward from the extremities of the reduced ends 3 and receive web portions 7 near the lower ends of inclined bars 8. The slotted ends of the posts 4 project above the overlapped ends of the strips 1 a distance to embrace opposite side of the webs 7. The webs 7 are formed by notches 9 in opposite sides of the inclined bars 8, said notches being inclined so that when the bars 8 are in proper position, opposite walls of the notches extend vertically and bear against opposite edges of the upper projecting ends of the posts 4. The width of the notches 9 corresponding to the width of the end portions of the posts are separated by the slots 6. The lower ends of the bars 8 are cut on a bevel or slant to admit of their resting squarely upon the overlapped ends of the strips 1 when the parts are properly positioned.

The upper ends of the bars 8 are cut away upon opposite sides to form tongues 10 which are of tapered form, the shoulders 11 at the inner ends of the tongues 10 being vertical when the bars 8 are in position so as to abut against the extremities of horizontal bars 12. Inclined grooves 13 are formed in opposite sides of the bars 8 and receive the ends of strips 14, which form braces to prevent lateral displacement of the bars 8 and assist materially in strengthening the structure.

The horizontal bars 12 cross each other at a right angle and their meeting sides are notched to admit of the bars being halved together so as to come flush at their upper and lower sides. Notches 15 are formed in the lower corners of the horizontal bars 12 to snugly receive the tongues 10 so as to form an interlocking joint between the meeting ends of the inclined bars 8 and the horizontal bars 12. When the bars 12 are in position they tend to force upper ends of diagonal bars 8 outward so as to cause the shoulders of the notches forming the webs 7 to bind against opposite edges of the projecting ends of the posts 4. This arrangement also causes the shoulders 11 to bear against the ends of the bars 12 and retain the same in place. The bars 12 form in effect keys and constitute upper portions of truss frames formed by diagonally arranged bars 8 and the interposed horizontal bars 12.

When the several parts are assembled in the completed structure, as illustrated in Fig. 1, the bars 8 incline upwardly and inwardly and are braced by the bars 12 and the strips 14, the latter, together with the strips 1 and the bars 12, forming horizontal supports for the poultry to perch upon. The structure may be placed in any position and by having the strips 1 project beyond the sides of the posts 4, mice and other animals are prevented from climbing the posts and reaching the poultry perched upon the horizontal bars. It is also noted that the framework, when set up, is substantial since the several parts interlocking by matching joints each have a close fit, the framework being adapted to be readily taken apart and easily and quickly set up when required.

Having thus described the invention, what is claimed as new is:

1. In a perch for poultry, the combination of a frame having openings, posts having their upper ends reduced and shouldered at the base of the reduced ends and passed through the openings of the frame, and having the projecting ends vertically slotted, upwardly inclined bars having portions near their lower ends reduced to form webs to enter the slots of the posts, the shoulders at the ends of the said webs embracing opposite sides of the posts, and means connecting upper ends of the said bars and causing the shouldered portions at the ends of the webs of said bars to bind against opposite sides of the posts.

2. In a poultry perch or like structure, the combination of a frame having openings, posts having their upper ends reduced and slotted and having the reduced ends passed through openings of the frame, inclined bars having oppositely disposed notches near their lower ends forming webs which are fitted into the slotted ends of the posts, the shoulders at the ends of the said notches embracing opposite sides of the slotted ends of the posts, and bars fitted between upper ends of oppositely arranged inclined bars, the meeting ends of the horizontal and inclined bars being united by interlocking joints.

3. In a poultry perch or like structure, the combination of a frame, posts having their upper ends reduced and fitted in openings of the frame and having their projecting ends vertically slotted, inclined bars having web portions near their lower ends fitted in the slots of the posts and having inclined tongues at their upper ends, and crossed horizontal bars fitted between the upper ends of the said inclined bars and having notches in their lower corners to receive the said inclined tongues at the upper ends of the inclined bars.

4. A poultry perch or like structure comprising strips arranged to form a frame with their end portions overlapped and having angular openings in their overlapped ends, posts having their upper ends reduced and slotted and having the reduced ends passed through the angular openings of the overlapped ends of said strips, upwardly inclined bars having their lower ends beveled to rest squarely upon the frame and having notches in opposite sides near their lower ends to form webs which are fitted in the slots formed in the reduced ends of the posts, said inclined bars having tongues at their upper ends, and cross bars halved together and provided in their lower corners with notches to receive the inclined tongues at the upper ends of the inclined bars.

In testimony whereof I affix my signature in presence of two witnesses.

CAROLINE F. LUCAS. [L. S.]

Witnesses:
S. M. PEACH,
J. D. CATHEY.